March 11, 1952
E. W. JOHNSON
2,588,633
SYSTEM AND APPARATUS FOR CONTROLLING THE
SUPPLY OF POWER TO ELECTRIC MOTORS
Filed Sept. 21, 1949
2 SHEETS—SHEET 1
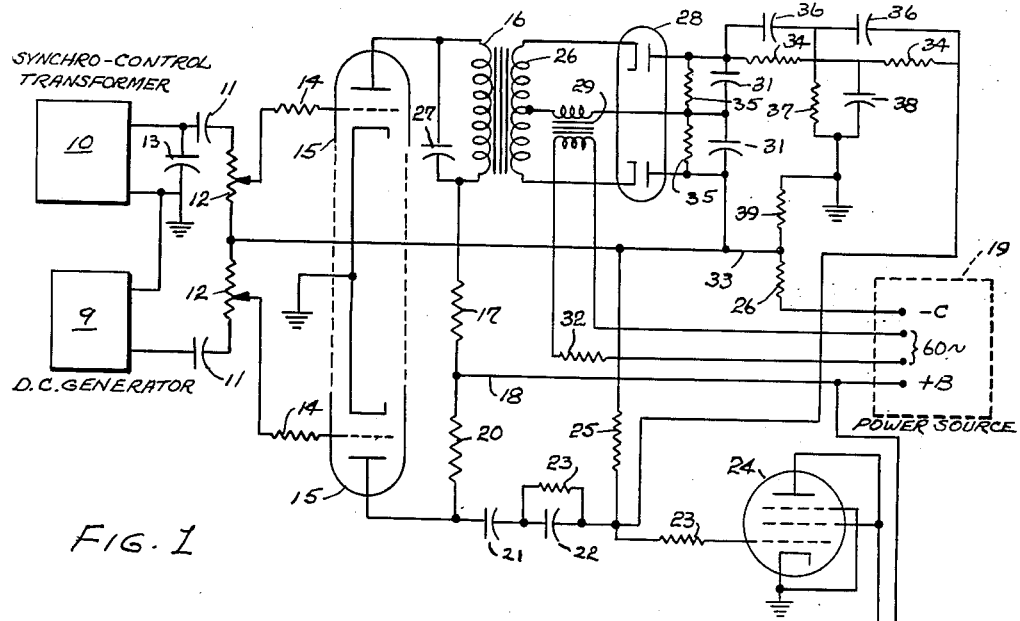
FIG. 1
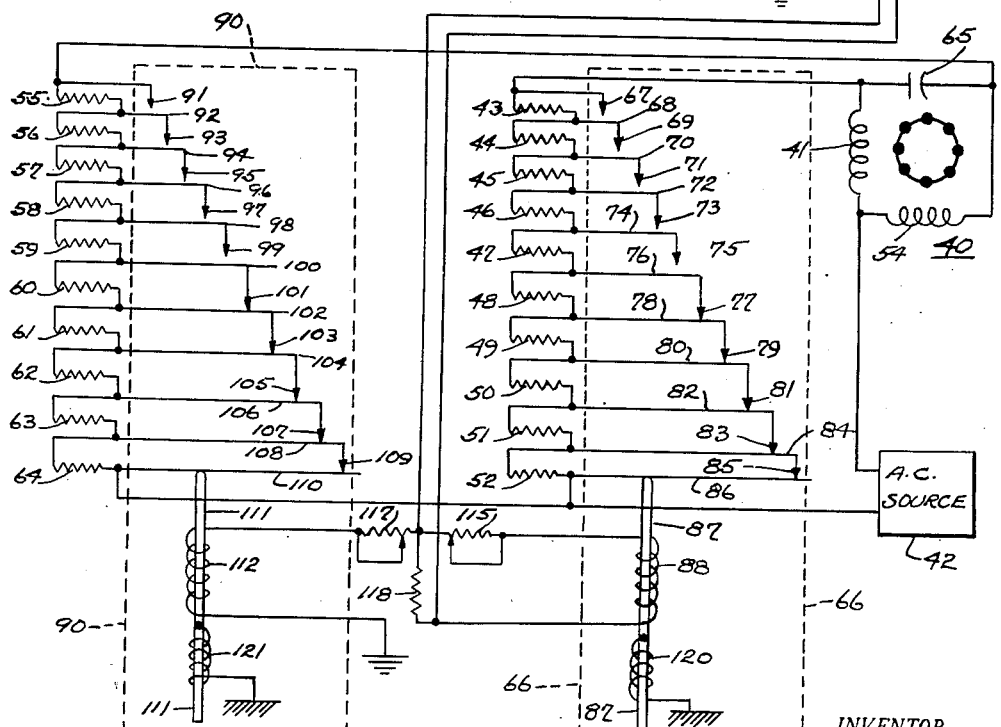
INVENTOR.
ERNEST W. JOHNSON
BY Robert J. Palmer
Attorney March 11, 1952     E. W. JOHNSON     2,588,633
SYSTEM AND APPARATUS FOR CONTROLLING THE
SUPPLY OF POWER TO ELECTRIC MOTORS
Filed Sept. 21, 1949                 2 SHEETS—SHEET 2

INVENTOR.
ERNEST W. JOHNSON
BY
Robert J. Palmer
Attorney

Patented Mar. 11, 1952

2,588,633

UNITED STATES PATENT OFFICE 2,588,633

SYSTEM AND APPARATUS FOR CONTROLLING THE SUPPLY OF POWER TO ELECTRIC MOTORS

Ernest W. Johnson, Everett, Mass., assignor to Transducer Corporation, Boston, Mass.

Application September 21, 1949, Serial No. 117,025

6 Claims. (Cl. 318—207)

This invention relates to circuits for controlling the power supplied to electric motors, and relates more particularly to circuits using relays for controlling the power supplied to remotely controlled electric motors of servo-mechanisms.

Relays are desirable for controlling the power supplied to electric motors in servo-mechanisms, since small error signals can control substantial amounts of power, but heretofore the controls using relays have had the disadvantages that the operation of the motors has not been smooth and accurate, and their speeds have not been controlled in even steps.

This invention provides smooth operation and evenly graduated speeds of the motors of servo-mechanisms. In one embodiment of the invention for controlling a two pole, two phase motor, a multiple contact relay is connected to each of the field windings, each relay including a plurality of series connected resistors, some but not all of which are shorted out. Error voltages from a synchro-control transformer, together with reference voltage from a 60 cycle, alternating current source, are supplied into the input of a phase detector, the output of which is applied to the control grid of a control tube. The plate current of the control tube energizes solenoids for the two relays which cause one relay to increase the number of shorted out resistors in its associated field circuit, and which cause the other relay to simultaneously decrease the number of shorted out resistors in its associated field circuit. This causes the motor to rotate in one or the other direction depending upon the phase of the input voltages, and causes the motor to increase or decrease its speed in even steps.

In another embodiment of the invention, the error voltage from the synchro-control transformer is applied to one field winding of a two phase motor, and voltage from a 60 cycle, alternating current source is applied to the other field winding of the motor. The rotor of the motor rotates brushes which wipe contacts connected to the junction points of series connected resistors which are connected to the field windings of a two phase motor which is to be controlled. Rotation of the brushes in one direction or the other causes the motor to be controlled to rotate in one direction or the other, and to change its speed depending upon the degree of rotation of the brushes.

An object of the invention is to provide smooth and uniform control of the speed of an electric motor.

Another object of the invention is to use a correction signal in a servo-mechanism to apply power to a remotely controlled motor in small, uniform steps.

The invention will now be described with reference to the drawing, of which:

Fig. 1 is a circuit schematic illustrating one embodiment of the invention, and

Figure 2:
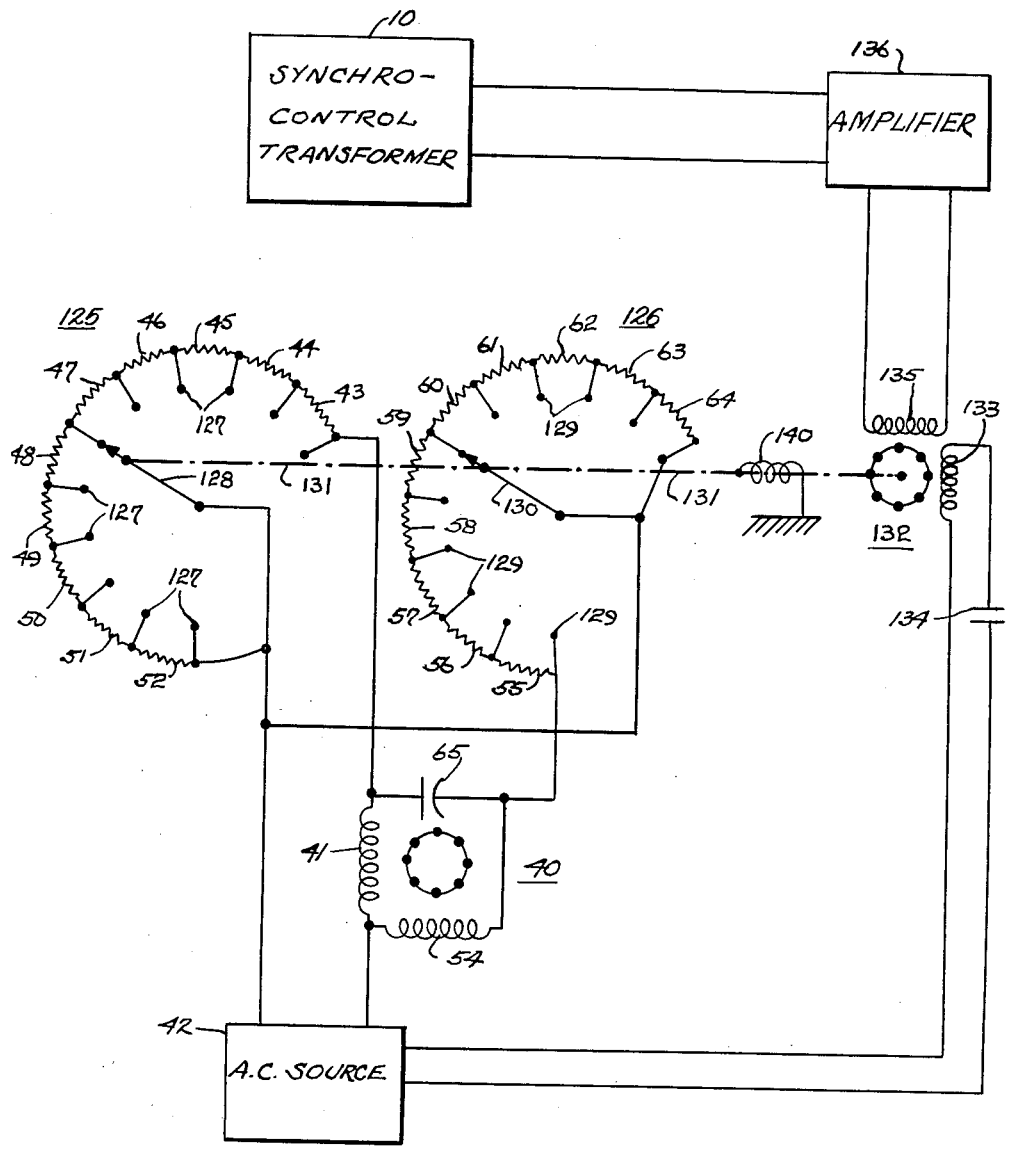
Fig. 2 is a circuit schematic illustrating another embodiment of the invention.

Referring first to Fig. 1 of the drawing, the conventional, sychro-control transformer 10 and the conventional, direct current, feed-back generator 9, have their outputs connected through the coupling capacitors 11 to the outer ends of the series connected potentiometers 12, one side of the output side of the transformer being connected through the capacitor 13 to ground.

The sliders of the potentiometers 12 are connected through the resistors 14 to the control grids of the dual triode tube 15, the cathodes of which are grounded. One plate of the tube 15 is connected to one side of the transformer winding 16, the other side of which is connected through the resistor 17 and the wiring 18 to a positive, direct current terminal of the power supply source 19. The resistor 17 is also connected through the resistor 20 to the other plate of the tube 15, which is connected through the capacitor 21, the capacitor 22 shunted by the resistor 23, and the resistor 24 to the control grid of the control tube 24, which also is connected through the resistors 25 and 26 to a negative bias voltage connection within the source 19.

The transformer winding 26 which is inductively coupled to the winding 16 which is shunted by the capacitor 27, is connected at its ends to the cathodes of the dual diode tube 28. The center point of the winding 26 is connected through the secondary winding of the transformer 29 to the junction point of the resistors 30 which are connected in series to the plates of the tube 28. A capacitor 31 is shunted across each resistor 30. The primary winding of the transformer 29 is connected through the resistor 32 to 60 cycle alternating current connections in the power source 19.

One plate of the tube 28 is connected to the wiring 33 leading to the negative bias terminal in the source 19, and its other plate is connected through the series connected resistors 34 to the junction point of the resistors 23 and 25 in the control grid circuit of the tube 24. The series connected capacitors 36 are connected to the outer ends of the resistors 34, and their junction point is connected through the resistor 37 shunted by the capacitor 38, to ground, and through the resistor 39 to the wiring 33.

The cathode and suppressor grid of the tube 24 are grounded. Its screen grid and plate are connected together and to the direct current, positive high voltage terminal of the source 19 through connections to be described in the following.

The circuit described so far is conventional. One side of the tube 15 amplifies the error voltages from the transformer 10 and supplys the amplified voltages to the phase detector tube 28 to which the reference voltage from the transformer 29 is also supplied. The output of the phase detector tube 24 is applied to the control grid of the control tube 24 together with an amplified feedback signal from the other section of the tube 15, and which, as is well known, is for anti-hunt purposes, and which originates at the direct current generator 9 which is driven, as is conventional, by the servomotor to be controlled.

The plate resistance of the control tube 24 varies with variations in the voltages applied to its control grid, and is used to control through the relays 66 and 90, the direction of rotation of, and the speed of the motor 40 as will now be described.

The motor 40 is a two pole, two phase motor having the field winding 41 connected at one side to one side of the 60 cycle source 42, and connected at its other side through the series connected resistors 43, 44, 45, 46, 47, 48, 49, 50, 51 and 52 to the other side of the source 42.

The other field winding 54 of the motor 40 is connected at one end to the source 42 at one side thereof, and is connected at its other end through the series connected resistors 55, 56, 57, 58, 59, 60, 61, 62, 63 and 64 to the other side of the source 42.

The phase shift capacitor 65 is connected to the field windings 41 and 54 of the motor 40.

The relay 66 has the contact 67 connected to the field winding 41; has the armature 68 with the contact 69 connected to the junction point of the resistors 43 and 44; has the armature 70 with the contact 71 connected to the junction point of the resistors 44 and 45; has the armature 74 with the contact 75 connected to the junction point of the resistors 46 and 47; has the armature 76 with the contact 77 connected to the junction point of the resistors 47 and 48; has the armature 78 with the contact 79 connected to the junction point of the resistors 48 and 49; has the armature 80 with the contact 81 connected to the junction point of the resistors 49 and 50; has the armature 82 with the contact 83 connected to the junction point of the resistors 50 and 51; has the armature 84 with the contact 85 connected to the junction point of the resistors 51 and 52, and has the armature 86 connected to the source 42.

The relay 66 has the plunger 87 of the solenoid 88 in contact with the underside of the armature 86. In its normal position as illustrated by Fig. 1 of the drawing, the plunger 87 has moved the armature 86 up against the contact 85 causing the armature 84 to be moved up against the contact 83, the armature 82 to be moved up against the contact 81, the armature 80 to be moved up against the contact 79, and the armature 78 to be moved up against the contact 77. Thus, normally the resistors 48, 49, 50, 51, and 52 are shunted out of the circuit of the field winding 41 of the motor 40.

The relay 90 has the contact 91 connected to the field winding 54 of the motor 40; has the armature 92 with the contact 93 connected to the junction point of the resistors 55 and 56; has the armature 94 with the contact 95 connected to the junction point of the resistors 56 and 57; has the armature 96 with the contact 97 connected to the junction point of the resistors 57 and 58; has the armature 98 with the contact 99 connected to the junction point of the resistors 58 and 59; has the armature 100 with the contact 101 connected to the junction point of the resistors 59 and 60; has the armature 102 with the contact 103 connected to the junction point of the resistors 60 and 61; has the armature 104 with the contact 105 connected to the junction point of the resistors 61 and 62; has the armature 106 with the contact 107 connected to the junction point of the resistors 62 and 63; has the armature 108 with the contact 109 connected to the junction point of the resistors 63 and 64, and has the armature 110 connected to the source 42.

The relay 90 has the plunger 111 of the solenoid 112 in contact with the underside of the armature 110. In its normal position as illustrated by Fig. 1 of the drawing, the plunger 111 has moved the armature 110 up against the contact 109 causing the armature 108 to be moved up against the contact 107, the armature 106 to be moved up against the contact 105, the armature 104 to be moved up against the contact 103, and the armature 102 to be moved up against the contact 101. Thus normally the resistors 60, 61, 62, 63, and 64 are shorted out of the circuit of the field winding 54 of the motor 40.

The solenoids 88 and 112, the potentiometers 115 and 116, the resistor 118 and the control tube 24 are connected in a balanced bridge circuit to the positive, high voltage, direct connection in the power source 19. Normally the same current flows through both solenoids at which time there is no error voltage from the control transformer 10. The same number of resistors are in the circuits of the field windings 41 and 54 of the motor 40, resulting in equal currents through the field windings so the motor is at rest.

If an error exists in one direction, the change in the bias on the control grid of the control tube 24, and the resulting change in its plate resistance, will unbalance the bridge circuit in one direction causing the solenoid 88 to become more strongly energized and the solenoid 112 to become less strongly energized. The increased current through the solenoid 88 causes it to move its plunger 87 further upwardly to cause the armature 76 to touch the contact 75 and short out the resistor 47 from the field circuit of the winding 41 of the motor 40. At the same time the decreased current through the solenoid 112 permits the spring 121 connected to the plunger 111 to move it downwardly causing the armature 102 to be spaced from the contact 101, and removing the short circuit from across the resistor 60, thus connecting this resistor in the circuit of the field winding 54 of the motor 40.

The removal of the resistor 47 from the circuit of the field winding 41, and the connection of the resistor 60 in the circuit of the field winding 54, will cause, without changing the current drawn by the motor 40, the field winding 41 to become more strongly energized and the field winding 54 to become less strongly energized, and will cause the motor to rotate in a direction to correct the error.

Further increases in error in the same direction will cause the solenoid 88 to become still more strongly energized, and the solenoid 112 to become still less strongly energized, and cause their plungers to short out other resistors in the circuit of the field winding 41, and to remove the shorts from across other resistors in the circuit of the field winding 54, causing the motor 40 to speed up in proportion to the degree of error.

As the error decreases towards zero, the energizing currents of the solenoids will approach normal causing more resistance to be inserted in the circuit of the field winding 41, and more resistance to be removed from the circuit of the field winding 54 until the motor 40 has rotated to correct the error.

Upon a reversal of error, the change in bias on the control grid of the control tube 24 will cause it to unbalance the bridge circuit in the other direction through its change in plate resistance, causing the solenoid 88 to become less strongly energized, and the solenoid 112 to become more strongly energized. This will cause the spring 120 connected to the plunger 87 to move it downwardly, and will cause the solenoid 112 to move its plunger 111 further upwardly. This will cause shorts to be removed from across first the resistor 48, next the resistor 49 and so on, and will cause shorts to be placed across first the resistor 59, next the resistor 58 and so on, the speed of the motor being increased smoothly in even steps as the error increases. As the error decreases, the speed of the motor decreases in proportion.

Referring now to Fig. 2 of the drawing, the relay 125 corresponds to the relay 66 of Fig. 1, and the relay 126 corresponds to the relay 90 of Fig. 1. The relay 125 has the contacts 127 arranged in a circular arc and connected to the junction points of the series connected resistors 43 to 52 which are connected to the field winding 41 of the motor 40, and the end ones of which are connected to the outer ends of the end resistors 43 and 52. The contacts 127 are arranged to be wiped by the rotary brush 128.

The relay 126 has the contacts 129 arranged in a circular arc and connected to the junction points of the series connected resistors 55 to 64 which are connected to the field winding 54 of the motor 40, and the end ones of which are connected to the outer ends of the end resistors 53 and 64. The contacts 129 are arranged to be wiped by the rotary brush 130.

The brush 128 is connected to the outer end of the resistor 52, and when rotated in a clockwise direction it increases the number of resistors it shorts out, it normally shorting out one half of the resistors connected to the field winding 41.

The brush 130 is connected to the outer end of the resistor 64, and when rotated in a clockwise direction it decreases the number of resistors it shorts out, it normally shorting out one half the resistors connected to the field winding 54.

The brushes 128 and 130 are connected through the linkage 131 to the rotor of the small, two pole, two phase, electric motor 132 which has one field winding 133 connected through the phase shifting capacitor 134 to the alternating current power source 42, and has the other field winding 135 connected through the amplifier 136 to the synchro-control transformer 10.

When the error is zero, the magnetic flux is established in the motor 132 by the field winding 133 alone so that no torque is produced in the motor. When an error exists, current flows in the winding 135 so that a rotating flux is produced which drives the motor in a direction to correct the error. A reversal in the direction of the error causes the phase of the current in the winding 135 to reverse, causing a reversal of the direction of rotation of the motor.

Rotation of the motor 132 in one direction causes the brushes 128 and 130 to rotate and to touch relay contacts which increase the number of resistors shorted out of the circuit of the field winding 41 by the relay 125, and which decrease the number of resistors shorted out of the circuit of the field winding 54 by the relay 126. This causes the field winding 41 to become more strongly energized than the field winding 54, and causes the motor 40 to rotate in a direction to correct the error.

Rotation of the motor in the other direction causes the brushes 128 and 130 to rotate in a direction to touch relay contacts which decrease the number of resistors shorted out of the circuit of the field winding 41 by the relay 125, and which increase the number of resistors shorted out of the circuit of the field winding 54 by the relay 126. This causes the field winding 54 to become more strongly energized than the field winding 41, causing the motor 40 to rotate in the opposite direction for correcting the error.

The spring 140 attached to the linkage 131, serves to restore the relay brushes 128 and 130 to their normal positions when the error is reduced to zero.

The motor 132 thus functions as a phase detector in addition to rotating the brushes of the relays which control the power supplied to the motor 40.

The motor 132 instead of rotating contact wiping arms could instead, rotate cams which would replace the solenoids and their plungers illustrated by Fig. 1 of the drawing, for moving the relay armatures against their associated contacts.

Another advantage of this invention is that the power supplied to the remotely controlled motor can be independent of the power operating the other elements of a servo-mechanism. The servo amplifier design is determined only by the error sensing units employed and not by the power requirements of the servomotor. The output stage of the servo amplifier can be of the same design for any size servomotor.

While embodiments of the invention have been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. A remote positioning system for an electric motor having a pair of windings for causing the rotor of the motor to rotate in opposite directions, comprising means including a first plurality of series connected resistors for energizing one of said windings, means including a second plurality of series connected resistors for energizing the other of said windings, resistor shorting means normally arranged to short out some but not all of the resistors of each of said pluralities of resistors, means for adjusting said shorting means for increasing the number of shorted out resistors in one of said pluralities and for simultaneously decreasing the number of shorted out resistors in the other of said pluralities, a phase detector, means for supplying an error signal to said detector, and means including said phase detector for actuating said means for adjusting said shorting means.

2. A remote positioning system as claimed in claim 1 in which the resistor shorting means includes a pair of relays having contacts connected to the junction points of the resistors, and includes solenoid means for connecting and disconnecting said contacts.

3. A remote positioning system as claimed in claim 1 in which the resistor shorting means includes contacts connected to the junction points of the resistors, and includes rotary contact connecting and disconnecting means, and in which the phase detector is an electric motor which rotates said rotary means.

4. A remote positioning system for an electric motor having a pair of windings for causing the rotor of the motor to rotate in opposite directions, comprising means including a first plurality of series connected resistors for energizing one of said windings, means including a second plurality of series connected resistors for energizing the other of said windings, resistor shorting means normally arranged to short out some but not all of the resistors of each of said pluralities of resistors, solenoid means for adjusting said shorting means to increase the number of shorted out resistors in one of said pluralities, and to decrease the number of shorted out resistors in the other of said pluralities, a phase detector, means for supplying an error voltage and a reference voltage into the input of said detector, and means connected to the output of said detector for energizing said solenoid means.

5. A remote positioning system for an electric motor having a pair of windings for causing the rotor of the motor to rotate in opposite directions, comprising means including a first plurality of series connected resistors for energizing one of said windings, means including a second plurality of resistors for energizing the other of said windings, resistor shorting means normally arranged to short out some but not all of the resistors in each of said pluralities, said shorting means including contacts connected to the junction points of the resistors and including rotary means, an alternating current motor having a pair of windings for causing its rotor to rotate in opposite directions, connected to said rotary means for rotating same, means for supplying error signals into one of said last mentioned windings, and means for supplying a constant frequency, constant voltage, alternating current into the other of said last mentioned windings.

6. A remote positioning system for an electric motor having a pair of windings for causing the rotor of the motor to rotate in opposite directions, comprising means including a first relay having a plurality of series connected resistors connected to one of said windings for energizing same, means including a second relay having a plurality of series connected resistors connected to the other of said windings for energizing same, contacts connected to the junction points of the resistors of said first relay, other contacts connected to the junction points of the resistors of said second relay, said relays having resistor shorting means normally arranged to short out some but not all of their resistors, each shorting means including a solenoid and a contact member movable thereby for electrically connecting and disconnecting its associated contacts, a phase detector, means for applying an error voltage and a reference voltage to the input of said detector, and means connected to the output of said detector for energizing one of said solenoids more strongly than the other solenoid when an error signal in one direction is applied to said detector, and for energizing the other of said solenoids more strongly than said one solenoid when an error signal in the opposite direction is applied to said detector.

ERNEST W. JOHNSON.

REFERENCES CITED

The following references are of record in the file of this patent:

UNITED STATES PATENTS

| Number | Name | Date |
|---|---|---|
| 1,042,692 | Kramer | Oct. 29, 1912 |
| 2,339,289 | Olken | Jan. 18, 1944 |
| 2,348,177 | Keeler | May 2, 1944 |
| 2,389,382 | Mikina | Nov. 20, 1945 |
| 2,406,193 | Carson | Aug. 20, 1946 |

FOREIGN PATENTS

| Number | Country | Date |
|---|---|---|
| 702,932 | France | Apr. 21, 1931 |